(12) United States Patent
Walach et al.

(10) Patent No.: US 11,587,227 B2
(45) Date of Patent: Feb. 21, 2023

(54) SYSTEM FOR DETECTING CONTRAST IN MEDICAL SCANS

(71) Applicant: AIDOC Medical LTD, Tel Aviv (IL)

(72) Inventors: Eugene Walach, Haifa (IL); Elad Walach, New York, NY (US); Idan Bassukevitch, Giv'atayim (IL); Yonatan Rosmarin, Avigdor (IL); Michael Braginski, Rishon LeTzion (IL)

(73) Assignee: AIDOC MEDICAL LTD, Tel Aviv (IL)

( * ) Notice: Subject to any disclaimer, the term of this patent is extended or adjusted under 35 U.S.C. 154(b) by 744 days.

(21) Appl. No.: 16/552,249

(22) Filed: Aug. 27, 2019

(65) Prior Publication Data

US 2021/0065358 A1 Mar. 4, 2021

(51) Int. Cl.
*G06T 7/00* (2017.01)
*G06V 10/50* (2022.01)

(52) U.S. Cl.
CPC .......... *G06T 7/0012* (2013.01); *G06V 10/507* (2022.01); *G06T 2207/10081* (2013.01); *G06T 2207/30016* (2013.01)

(58) Field of Classification Search
None
See application file for complete search history.

(56) References Cited

U.S. PATENT DOCUMENTS

| 2005/0113680 | A1* | 5/2005 | Ikeda | G06T 7/0012 128/920 |
| 2018/0365824 | A1* | 12/2018 | Yuh | G06T 7/68 |

OTHER PUBLICATIONS

Ojeda, Patricia, et al. "The utility of deep learning: evaluation of a convolutional neural network for detection of intracranial bleeds on non-contrast head computed tomography studies." Medical Imaging 2019: Image Processing. vol. 10949. SPIE, 2019. (Year: 2019).*
Nurhayati, Oky Dwi, and Ike Pertiwi Windasari. "Stroke identification system on the mobile based CT scan image." 2015 2nd International Conference on Information Technology, Computer, and Electrical Engineering (ICITACEE). IEEE, 2015. (Year: 2015).*

(Continued)

*Primary Examiner* — Samah A Beg
(74) *Attorney, Agent, or Firm* — Ziegler IP Law Group, LLC

(57) ABSTRACT

An apparatus for analysing a head CT scan, where the head CT scan includes a plurality of cross-sections, includes a processor configured to select a first cross-section from among the plurality of cross-sections in the head CT scan; and analyse the first cross-section to determine whether the whole head CT scan was taken with contrast. The analyzing includes determining whether the first cross-section shows contrast, based on a presence of bright patches in the first cross-section, determining whether an amount of sulci in the first cross-section is below a threshold amount. In response to determining that the first cross-section shows contrast, determine that the whole head CT scan was taken with contrast, and in response to the determining that the first cross-section does not show contrast and that the amount of sulci is below the threshold amount determining that the whole head CT scan was taken without contrast.

19 Claims, 9 Drawing Sheets

(56) References Cited

OTHER PUBLICATIONS

Napier, John, et al. "A CAD System for Brain Haemorrhage Detection in Head CT Scans." IEEE EUROCON 2019—18th International Conference on Smart Technologies. IEEE, 2019. (Year: 2019).*

Lisowska, Aneta, et al. "Context-aware convolutional neural networks for stroke sign detection in non-contrast CT scans." Annual Conference on Medical Image Understanding and Analysis. Springer, Cham, 2017. (Year: 2017).*

* cited by examiner

SYSTEM FOR DETECTING CONTRAST IN MEDICAL SCANS

FIELD

The aspect of the disclosed embodiments relate to a system, apparatus and method for detecting whether a medical scan was taken using contrast.

BACKGROUND

CT scanners take a plurality of X-ray measurements at different angles around a 3D object (e.g. a patient's head). These measurements are processed to create a plurality of cross-sectional images (also known as 'slices') of the 3D object. Hence, the object is represented by a plurality of cross-sections. In other words, a CT scan comprises a plurality of cross-sections.

Areas of the object which absorbed a high proportion of the X-rays during the scan (e.g. bone) are assigned a high CT number, and therefore appear lighter in the cross-sectional images, while areas of the object which absorbed a lower proportion of X-rays (e.g. muscle tissue) are assigned a low CT number, and appear darker. The CT number is measured in Hounsfield units.

CT scans can be taken either with or without contrast. In a CT scan with contrast (i.e. a contrast CT scan), the patient being scanned has been given a contrast agent (e.g. an iodine based compound). For example, the patient may ingest a solution containing the contrast agent, or it may be injected into the patient.

The contrast agent absorbs a high proportion of X-rays. Therefore, when a CT scan takes place, areas with a high concentration of contrast agent (such as blood vessels) absorb more of the X-rays and therefore appear lighter (i.e. have a higher CT number) in the CT scan. Hence, a contrast CT scan helps to highlight areas such as blood vessels.

Due to the function of the contrast agent, each of the cross-sectional images in a contrast CT scan appear different than if contrast was not used in the scan.

Automated processing of medical images, such as CT scans, has increased rapidly with, among other this, the explosive growth of artificial intelligence (AI) applications. This trend includes the detection of brain bleeds and other brain lesions by analysing head CT scans. One of the factors hampering the automated detection of such brain lesions is the fact that head CT scans may have been acquired either with or without a contrast agent. Since the presence of contrast affects the appearance of the cross-sectional images in the CT scan, a correct image interpretation (e.g. classification or detection of brain bleed or brain lesion) hinges on the ability to determine whether or not a contrast agent has been used in the CT scan.

Consider an example in which an AI application comprises a neural network configured to classify brain bleeds in non-contrast head CT scans. In other words, the neural network has been trained using a database of non-contrast head CT scans. In non-contrast head CT scans, a brain bleed would appear fairly dark, having a CT number (i.e. pixel brightness value) of approximately 30 Hounsfield units. Hence, the AI application would be trained to identify groups of pixels with values of approximately 30 Hounsfield units as brain bleeds.

In contrast CT scans, blood is mixed with the contrast agent, which absorbs a high proportion of X-rays. As a result, a brain bleed in a contrast CT scan is shown as a bright patch, having a CT number of over 100 Hounsfield units.

Hence, if a contrast CT scan including a brain bleed was input into an AI application configured to classify brain bleeds in non-contrast CT scans, the brain bleed would be missed. In other words, the AI application would incorrectly classify the CT scan as not having a brain bleed.

Hence, in order to correctly perform automated processing of medical images, there is a need to determine whether the medical images (e.g. CT scans) were taken with or without contrast.

However, when a contrast agent is used in a CT scan, not all cross-sections in the scan show visible evidence of the contrast agent. As such, the lack of contrast in a particular cross-section does not necessarily mean that contrast was not used in the entire CT scan (i.e. other cross-sections may show evidence of the contrast agent).

Since not all cross-sections in a contrast CT scan show evidence of the contrast, conventional methods require a large number of cross-sections to be analysed before it can be determined that a CT scan did not use contrast. Since modern high-resolution CT images have, in some cases, over 1000 cross sections, processing such a large volume of data to determine whether a CT scan includes contrast can be costly and time consuming, causing a delay in the processing pipeline. Hence, there is a need to identify whether a CT scan has been taken with or without contrast, in an efficient manner.

It is an aim to provide a system, apparatus and method that overcomes problems associated with conventional systems and apparatuses.

SUMMARY

According to an aspect, there is provided an apparatus for analysing a head CT scan, wherein the head CT scan comprises a plurality of cross-sections, the apparatus comprising a processor configured to: select a first cross-section from among the plurality of cross-sections in the head CT scan; and analyse the first cross-section to determine whether the whole head CT scan was taken with contrast, the analysing comprising: determining whether the first cross-section shows contrast, based on a presence of bright patches in the first cross-section, determining whether an amount of sulci in the first cross-section is below a threshold amount, in response to determining that the first cross-section shows contrast, determine that the whole head CT scan was taken with contrast, and in response to the determining that the first cross-section does not show contrast and that the amount of sulci is below the threshold amount determining that the whole head CT scan was taken without contrast.

In some embodiments, the processor is further configured to, in response to determining that the first cross-section does not show contrast and that the amount of sulci in the first cross-section is not below the threshold amount, select a second cross-section from among the plurality of cross-sections and analyse the second cross-section to determine whether the whole head CT scan was taken with contrast.

In some embodiments, the processor is further configured to identify a brain area in the first cross-section, the brain area showing brain tissue; and calculate an average brain pixel value of pixels from among a plurality of pixels in the cross section which are in the brain area.

In some embodiments, the processor is configured to identify the brain area in the first cross-section by identifying a maximal connected component in the cross-section, comprising a plurality of connected pixels with pixel values above a threshold pixel value, identifying the brain area as a largest hole in the maximal connected component.

In some embodiments, the threshold pixel value is 1000 Hounsfield units.

In some embodiments, the processor is configured to determine whether the amount of sulci in the first cross-section is below the threshold amount by generating a binary image of pixels in the brain area which have a pixel value below the average brain pixel value; obtaining an Euler number of the binary image; determining whether the Euler number of the binary image is below a threshold Euler number; and determining that the amount of sulci in the first cross-section is below the threshold amount in response to determining that the Euler number of the binary image is below the threshold Euler number.

In some embodiments, the threshold Euler number is zero.

In some embodiments, the processor is configured to determine whether the amount of sulci in the first cross-section is below the threshold amount by: generating a binary image of pixels in the brain area which have a pixel value below a threshold amount below the average brain pixel value; identifying groups of pixels in the binary image representing pixels in the first cross-section with pixel values a threshold amount below the average brain pixel value; determining whether a percentage of pixels in the binary image identified as being in a group is below a threshold percentage; and determining that the amount of sulci in the first cross-section is below the threshold amount in response to determining that the percentage of pixels identified as being in a group is below the threshold percentage.

In some embodiments, the threshold percentage is 20%.

In some embodiments, the threshold amount below the average brain pixel value is 20 Hounsfield units.

In some embodiments, the processor is configured to determine whether the first cross-section shows contrast by: identifying groups of pixels in the brain area, the groups of pixels having average pixel values a threshold amount above the average brain pixel value; determining that the cross-section shows contrast in response to determining that the number of identified groups is above a threshold number of groups.

In some embodiments, the threshold amount above the average brain pixel value is 40 Hounsfield units.

In some embodiments, the threshold number of groups is 20.

In some embodiments, the processor is configured to assign a plurality of priority levels to cross-sections in the CT scan based on a set of predetermined rules, and select the first cross-section as the cross-section in the CT scan with the highest priority level.

In some embodiments, the priority levels decrease from cross-sections at a top of the CT scan to cross-sections at a bottom of the CT scan.

According to an aspect, there is provided a system comprising: the apparatus of any of claims 1 to 15, further comprising: a first image analysis unit to analyse a CT scan taken with contrast and output a result indicating whether the CT scan shows a predetermined feature; and a second image analysis unit to analyse a CT scan taken without contrast and output a result indicating whether the CT scan shows a predetermined feature, wherein the processor of the apparatus is further configured to: in response to determining that the whole head CT scan was taken with contrast, control the first image analysis unit to analyse the head CT scan, and in response to determining that the whole head CT scan was taken without contrast, control the second image analysis unit to analyse the head CT scan.

In some embodiments, at least one of the first image analysis unit and the second image analysis unit is an artificial intelligence, AI, classifier.

In some embodiments, the predetermined feature is a brain bleed.

According to an aspect, there is provided a computer-implemented method for analysing a head CT scan, wherein the head CT scan comprises a plurality of cross-sections, the method comprising: selecting a first cross-section from among the plurality of cross-sections in the head CT scan; and analysing the first cross-section to determine whether the whole head CT scan was taken with contrast, the analysing comprising: determining whether the first cross-section shows contrast, based on a presence of bright patches in the first cross-section, determining whether an amount of sulci in the first cross-section is below a threshold amount, in response to determining that the first cross-section shows contrast, determine that the whole head CT scan was taken with contrast, and in response to the determining that the first cross-section does not show contrast and that the amount of sulci is below the threshold amount determining that the whole head CT scan was taken without contrast.

In some embodiments, the method further comprises, in response to determining that the first cross-section does not show contrast and that the amount of sulci in the first cross-section is not below the threshold amount, selecting a second cross-section from among the plurality of cross-sections and analyse the second cross-section determining whether the whole head CT scan was taken with contrast.

In some embodiments, the method is further comprises identifying a brain area in the first cross-section, the brain area showing brain tissue; and calculating an average brain pixel value of pixels from among a plurality of pixels in the cross section which are in the brain area.

In some embodiments, the method further comprises identifying the brain area in the first cross-section by identifying a maximal connected component in the cross-section, comprising a plurality of connected pixels with pixel values above a threshold pixel value, identifying the brain area as a largest hole in the maximal connected component.

In some embodiments, the threshold pixel value is 1000 Hounsfield units.

In some embodiments, the method further comprises determining whether the amount of sulci in the first cross-section is below the threshold amount by generating a binary image of pixels in the brain area which have a pixel value below the average brain pixel value; obtaining an Euler number of the binary image; determining whether the Euler number of the binary image is below a threshold Euler number; and determining that the amount of sulci in the first cross-section is below the threshold amount in response to determining that the Euler number of the binary image is below the threshold Euler number.

In some embodiments, the threshold Euler number is zero.

In some embodiments, the method further comprises determining whether the amount of sulci in the first cross-section is below the threshold amount by: generating a binary image of pixels in the brain area which have a pixel value below a threshold amount below the average brain pixel value; identifying groups of pixels in the binary image representing pixels in the first cross-section with pixel values a threshold amount below the average brain pixel value; determining whether a percentage of pixels in the binary image identified as being in a group is below a threshold percentage; and determining that the amount of sulci in the first cross-section is below the threshold amount in response to determining that the percentage of pixels identified as being in a group is below the threshold percentage.

In some embodiments, the threshold percentage is 20%.

In some embodiments, the threshold amount below the average brain pixel value is 20 Hounsfield units.

In some embodiments, the method further comprises determining whether the first cross-section shows contrast by: identifying groups of pixels in the brain area, the groups of pixels having average pixel values a threshold amount above the average brain pixel value; determining that the cross-section shows contrast in response to determining that the number of identified groups is above a threshold number of groups.

In some embodiments, the threshold amount above the average brain pixel value is 40 Hounsfield units.

In some embodiments, the threshold number of groups is 20.

In some embodiments, the method further comprises assigning a plurality of priority levels to cross-sections in the CT scan based on a set of predetermined rules, and select the first cross-section as the cross-section in the CT scan with the highest priority level.

In some embodiments, the priority levels decrease from cross-sections at a top of the CT scan to cross-sections at a bottom of the CT scan.

In some embodiments, the method further comprises: in response to determining that the whole head CT scan was taken with contrast, control a first image analysis unit to analyse the head CT scan, and in response to determining that the whole head CT scan was taken without contrast, controlling a second image analysis unit to analyse the head CT scan, wherein the first image analysis unit is configured to analyse a CT scan taken with contrast and output a result indicating whether the CT scan shows a predetermined feature; and the second image analysis unit is configured to analyse a CT scan taken without contrast and output a result indicating whether the CT scan shows a predetermined feature, In some embodiments, at least one of the first image analysis unit and the second image analysis unit is an artificial intelligence, AI, classifier.

In some embodiments, the predetermined feature is a brain bleed.

According to an aspect, there is provided an apparatus for analysing a head CT scan, wherein the head CT scan comprises a plurality of cross-sections, the apparatus comprising a processor, and a memory storing instructions to enable the processor to select a first cross-section from among the plurality of cross-sections in the head CT scan; and analyse the first cross-section to determine whether the whole head CT scan was taken with contrast, the analysing comprising: determining whether the first cross-section shows contrast, based on a presence of bright patches in the first cross-section, determining whether an amount of sulci in the first cross-section is below a threshold amount, in response to determining that the first cross-section shows contrast, determine that the whole head CT scan was taken with contrast, and in response to the determining that the first cross-section does not show contrast and that the amount of sulci is below the threshold amount determining that the whole head CT scan was taken without contrast.

The memory may comprise RAM, ROM, solid state memory; a removable disks a hard disk drive; magnetic media; an optical disk or any other type of storage. The apparatus may be provided on a single device or on multiple devices.

BRIEF DESCRIPTION OF THE DRAWINGS

Embodiments will now be described, by way of example only, with reference to the accompanying drawings, in which.

DETAILED DESCRIPTION OF THE EMBODIMENTS

Figure 1:
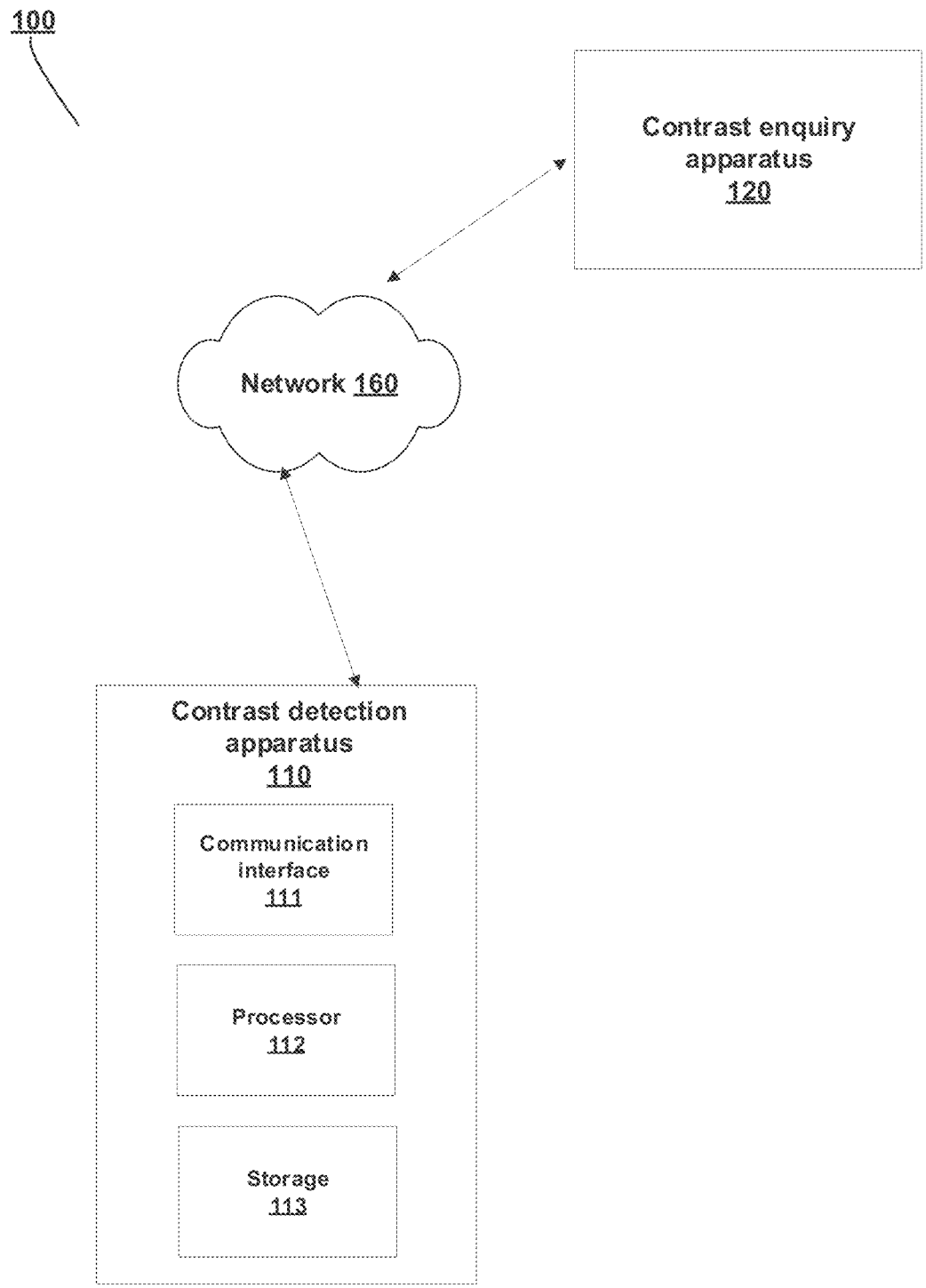
FIG. 1 shows a schematic illustration of a system according to an embodiment.

FIG. 1 shows a system 100 according to an embodiment. The system 100 of FIG. 1 will be discussed with reference to the example of a head CT scan for ease of explanation. The system 100 comprises a contrast detection apparatus 110 and a contrast enquiry apparatus 120. The contrast detection apparatus 110 can communicate with the contrast enquiry apparatus 120 over a network 160.

It will be appreciated that in practical implementations of embodiments, there may be many such contrast enquiry apparatuses and/or contrast detection apparatuses, but one of each will be described with relation to FIG. 1 for ease of explanation.

In this embodiment, the contrast enquiry apparatus 120 is configured to transmit a head CT scan to the contrast detection apparatus 110 over the network 160, and to receive a contrast detection result from the contrast detection apparatus 110. In other words, the contrast enquiry apparatus 120 is configured to send data corresponding to a sequence of a plurality of cross-sections obtained from a CT scan of the head, and to receive data from the contrast detection apparatus 110 indicating that the CT scan is either a contrast CT scan or is a non-contrast CT scan.

The network 160 in this embodiment is the internet. However, embodiments are not limited to this and any suitable communications technology could be used.

In this embodiment, the contrast enquiry apparatus 120 is a PC. However, in other embodiments the contrast enquiry apparatus 120 could be implemented by a smartphone, PDA or other suitable computer device. In some embodiments, the contrast enquiry apparatus is a CT scanner.

It will be appreciated that in some embodiments, the contrast enquiry apparatus may only send the CT scan to the contrast detection apparatus (and not receive a contrast detection result), or the contrast enquiry apparatus may only receive a contrast detection result (i.e. without sending the image to the contrast detection apparatus).

As shown in FIG. 1, the contrast detection apparatus 110 comprises a communication interface 111, a processor 112, and a storage 113. In this embodiment, the contrast detection apparatus 110 is a single apparatus. However, embodiments are not limited to this and the contrast detection functionality of other embodiments could be provided in more than one connected apparatus.

In this embodiment, the communication interface 111 is configured to communicate with the contrast enquiry apparatus 110 to receive a head CT scan from the contrast enquiry apparatus 120, and to send a contrast detection result to the contrast enquiry apparatus 120 In other words, the contrast detection apparatus 110 is configured to receive data corresponding to a plurality of cross-sections obtained from a CT scan of the head, and to send data to the contrast enquiry apparatus 120 indicating that the CT scan is either a contrast CT scan or is not a contrast CT scan.

However, embodiments are not limited to this. For example, in other embodiments, the communication interface may instead receive the head CT scan from a different source (e.g. a different connected apparatus) and/or may send the contrast detection result to a different source, or simply store in the results in a storage for later retrieval.

The processor 112 is configured to analyse the cross sections of the received head CT scan to determine whether a contrast agent was used in the head CT scan (i.e. whether it is a contrast head CT scan). As discussed in more detail later, the processor 112 is configured to determine whether the head CT scan includes contrast by analysing only a small number of cross-sections (e.g. one or two), by basing the determination on both whether contrast is visible in a given cross-section, and an amount (e.g. size and structure) of sulci shown in the cross-section. Sulci are the grooves/depressions on the surface of the brain.

The presence (or lack) of sulci can be used to determine whether a lack of visible contrast in a cross-section indicates that the entire CT scan lacks contrast. This is because, even when a contrast agent has been used, some of the cross-sections may be free of visible signs of the contrast agent being present (e.g. bright areas showing blood vessels with contrast agent). This is particularly true for top areas of the brain, which are characterised by the presence of sulci.

In other words, when a cross-section does not show any visible sign of contrast, sometimes this does indicate that contrast was not used in the CT scan (e.g. if the cross-section is a central area of the brain), but sometimes this is not sufficient to determine that cross-section was not used at all in the scan (e.g. if the cross-section is a top area of the brain).

Hence, the processor 112 is configured to assess both whether signs of a contrast agent are visible and whether sulci are visible, to determine whether or not it can be concluded from a given cross-section that contrast was not used in the entire head CT scan.

The processor 112 is configured to return a result that either the head CT scan does include contrast or does not include contrast, and is configured to control the communication interface 111 to transmit this result to the contrast enquiry apparatus 120.

The storage 113 is configured to store information determined by the processor 112, as discussed further later.

Figure 2:
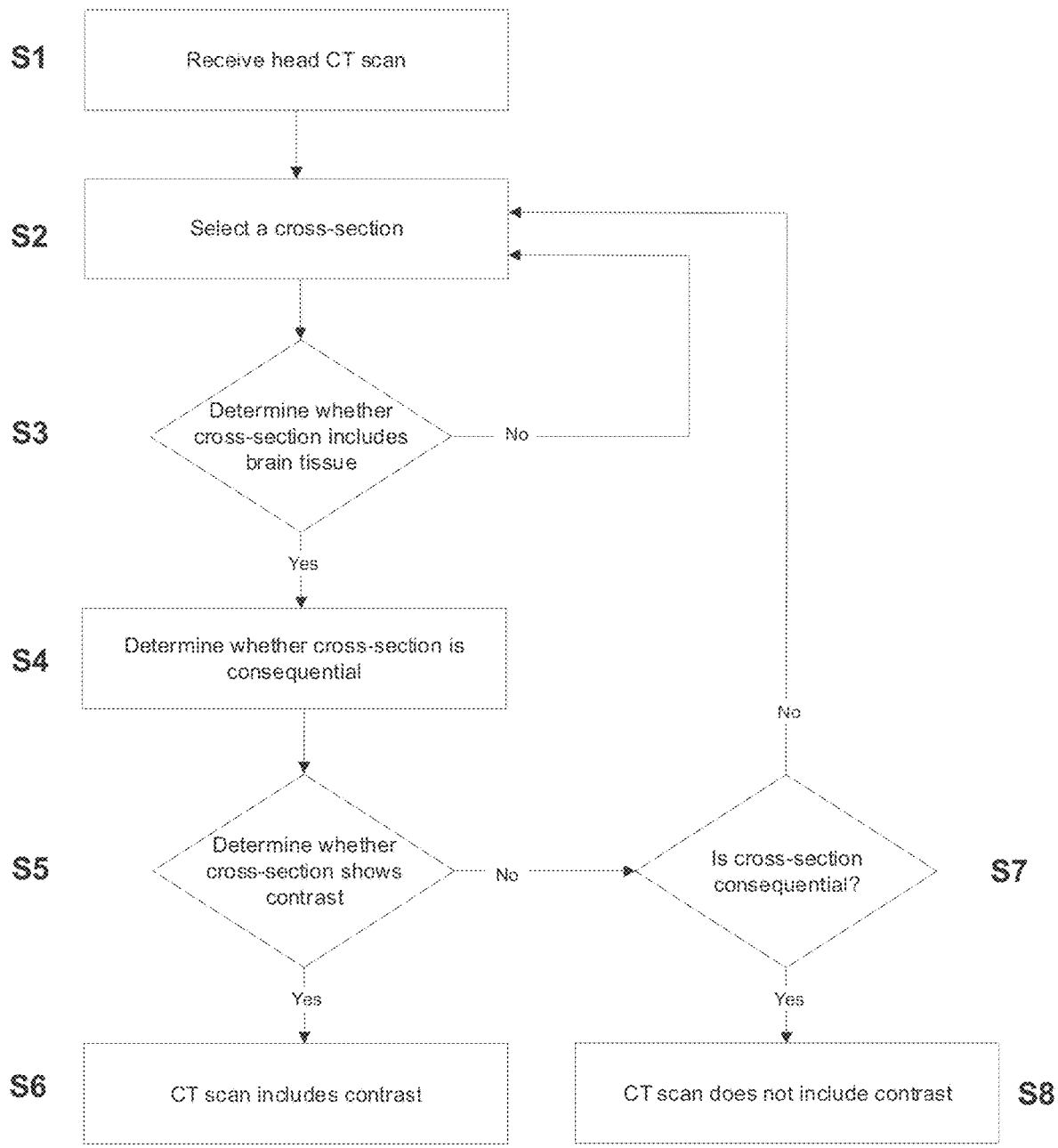
FIG. 2 shows a flow chart of the operation of the embodiment.

FIG. 2 is a flowchart showing the operation of the contrast detection apparatus 110 of FIG. 1. Through the method of FIG. 2 discussed below, the contrast detection apparatus 110 can determine whether a CT scan (including a plurality of cross-sections) is a contrast CT scan or a non-contrast CT scan. As discussed in detail below, this is achieved by determining whether the cross-section shows sulci and whether the cross-section shows visible evidence of a contrast agent.

Figure 3:
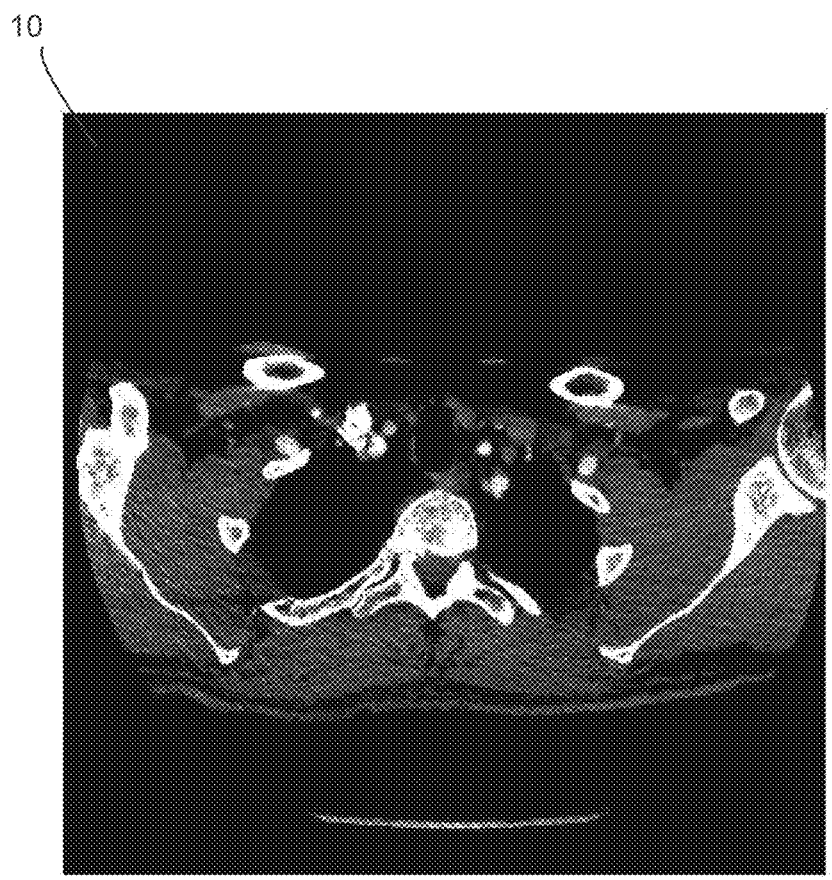
FIG. 3 shows an example image.

FIG. 3 is an example image of a CT cross section which does not show brain tissue. FIGS. 4A-D are examples images which each do show brain tissue.

The operation of the flowchart of FIG. 2 will now be discussed with reference to the examples of FIGS. 3 and 4A-D.

At step S1 of FIG. 2, the communication interface 111 of the contrast detection apparatus 111 receives a head CT scan from the enquiry apparatus 120. The head CT scan comprises a sequence of a plurality of cross-sections of the head. Each cross-section comprises a plurality of pixels, each having a CT number (i.e. a pixel value). The CT number is measured in Hounsfield units. In variants of this embodiment, the contrast detection apparatus may instead retrieve the head CT scan from a storage or receive it from a different apparatus.

At step S2, the processor 112 of the contrast detection apparatus 111 selects a cross-section from the plurality of cross-sections in the head CT scan. In this embodiment, the processor 112 selects the 50th cross-section in the sequence. For example, if the head CT scan comprises 1000 cross-sections, the processor 112 selects the 50th cross-section in the sequence. However, embodiments are not limited to this, and any cross-section could be selected instead. Furthermore, as discussed further later, in variants of this embodiment, step S2 involves sub-sampling the sequence of cross-sections and selecting a cross-section based on determined priority levels of the cross-sections.

At step S3 the processor 112 determines whether the selected cross-section includes brain tissue. As discussed above (and below), the contrast detection apparatus 111 is configured to determine whether contrast was used based on cross-sections showing brain tissue. Since the CT scanner may have scanned more than just the brain of the patient, the received CT scan may include cross-sections which do not include brain tissue. The processor 112 is therefore configured to determine whether the selected cross-section shows brain tissue before continuing to determine whether the CT scan used contrast.

In this embodiment, the processor 112 determines whether the selected cross-section includes brain tissue by firstly thresholding the image with a threshold of 1000 Hounsfield units. In other words, the process 112 creates a binary image in which all of the pixels in the cross-section with a CT number above 1000 Hounsfield units are assigned a value of '1', and all pixels in the cross-section with a value below 1000 Hounsfield units are assigned a value of '0'. Then, the processor locates the maximal connected component in the binary image (i.e. locates the largest group of connected pixels with a value of '1'), which is assumed to represent the skull. Then, the processor 112 identifies the largest hole in the maximal connected component. In other words, the processor 112 identifies the largest area enclosed by the maximal connected component, which is not a part of the maximal connected component. The processor then determines whether the largest hole has a reasonable size. In this embodiment, the processor 112 determines that the largest hole has a reasonable size if it covers an area of 5000 pixels or has a maximum radius of at least 300 pixels. However, embodiments are not limited to this and any suitable threshold can be used instead.

While this method is used in this embodiment, it will be appreciated that any suitable method of identifying whether the cross-section includes brain tissue could be used instead. For example, in some embodiments, the processor can take further steps to account for discontinuities in the skull (e.g. due to surgery), or to account for large cysts that manifest themselves as holes inside the bone structure. In other embodiments, an AI segmentation model or an AI detection model could be used instead.

In a variant of this embodiment, the contrast detection apparatus 110 is always provided (i.e. the contrast detection apparatus effectively assumes that it is always provided) with a CT scan (comprising a plurality of cross-sections) in which all cross-sections include brain tissue. In such a variant, step S3 involves determining where the brain tissue is, rather than determining whether brain tissue is present.

In other embodiments, step S3 may be optional.

If the processor determines that the selected cross-section does not include brain tissue, then the method returns to step S2 and a new cross-section is selected. In this embodiment, the new cross-section is selected by adding 50 to the most recently selected cross-section. For example, if the most recently selected cross-section was the 50th in the sequence, then the next selected cross section would be the 100th, then the 150th etc. However, embodiments are not limited to this, and in other embodiments, other methods for selecting the next cross-section can be used instead, as discussed further later.

If the processor determines that the selected cross-section does include brain tissue at step S3, then the method proceeds to step S4.

At step S4, the processor 112 determines whether the selected cross-section is a 'consequential' cross-section, and stores the result in the storage 113.

A 'consequential' cross-section is a cross-section for which a lack of visible contrast agent results in the conclusion that there is no contrast in the entire CT scan. An 'inconsequential' cross-section is a cross-section for which a lack of visible contrast agent does not result in the conclusion that there is no contrast in the entire CT scan.

Hence, irrespective of whether a cross-section of a CT scan is consequential or inconsequential, if evidence of a contrast agent is visible, it can be concluded that the entire CT scan includes contrast.

If evidence of a contrast agent is not visible, and the cross-section is consequential, it can be concluded that the entire CT scan does not include contrast.

If evidence of a contrast agent is not visible, and the cross-section is not consequential (i.e. is inconsequential), a conclusion cannot be reach as to whether the entire CT scan includes contrast, and a different cross-section needs to be analysed.

Hence, a consequential cross-section can be used to determine that a CT scan does not include contrast. A non-consequential cross-section cannot be used to determine that a CT scan does not include contrast. Either a consequential cross-section or a non-consequential cross-section can be used to determine that a CT scan does include contrast.

As discussed above, when contrast is used in a head CT scan, cross-sections near the top of the brain will sometimes show no visible evidence of the contrast (e.g. no bright spots). Hence, cross-sections near the top of the brain are inconsequential, while cross-sections of other parts of the brain are consequential.

Figure 4A:
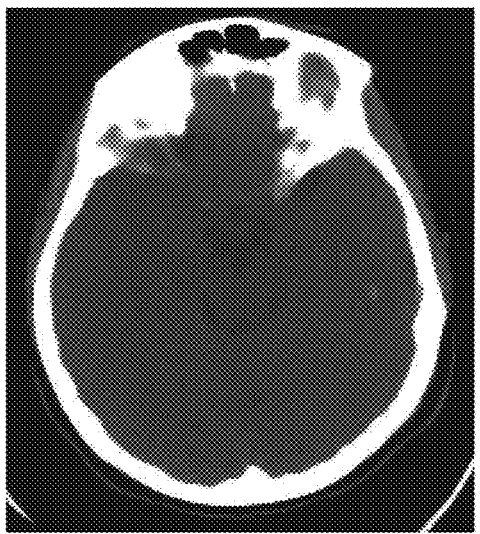
FIGS. 4A-D show example images.
Figure 4B:
Figure 4C:
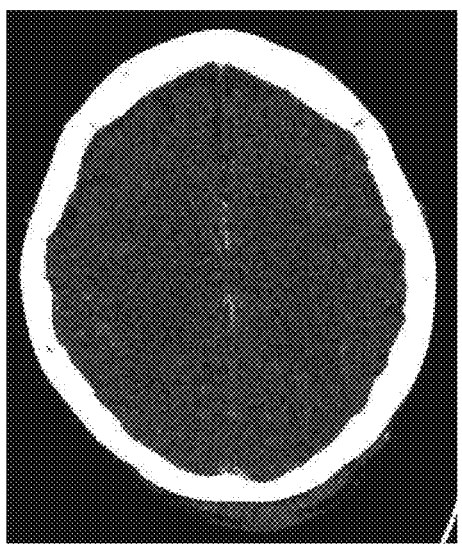
Figure 4D:

The top of the brain is characterised by the presence of sulci, which are grooves/depressions in the brain (e.g. see FIG. 4B or FIG. 4D which both show such sulci). Hence, an inconsequential cross-section includes sulci, while a consequential cross section does not include sulci (or includes only a small amount of sulci). Hence, consequential and inconsequential cross-sections differ from each other in the size and structure of sulci shown.

Figure 5:
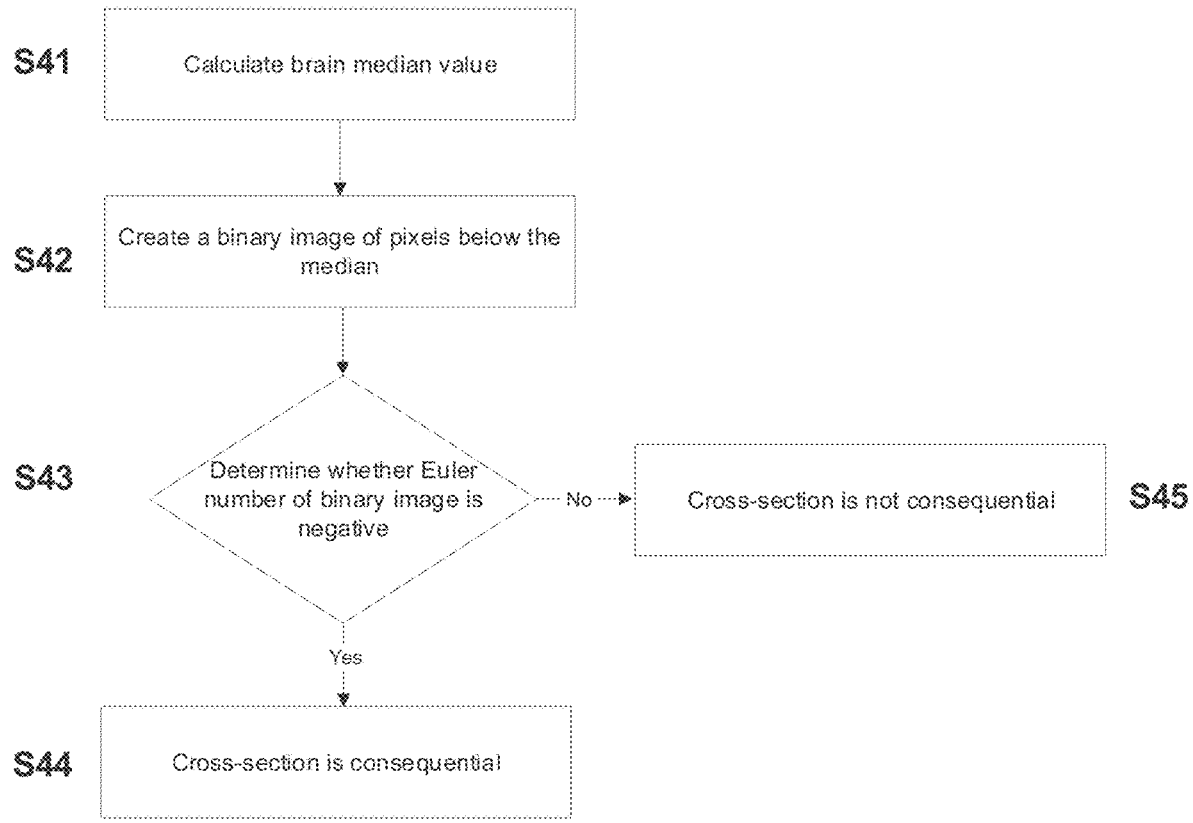
FIG. 5 shows a flow chart of the operation of the embodiment.

At step S4, the processor 112 determines whether the cross-section is consequential or inconsequential based on the size and structure of sulci shown in the cross-section. The specific method used for determining an amount of sulci in the cross-section will be discussed in detail later with regard to FIG. 5. In other words FIG. 5 is a flowchart showing step S4 in detail.

Once the processor 112 determines whether or not the cross-section is consequential at step S4, and stores the result in the storage 113, the method proceeds to step S5.

At step S5, the processor 112 determines whether or not the cross-section shows visible signs of a contrast agent. When a contrast agent is used in the CT scan, blood vessels containing blood mixed with the contrast agent appear brighter in the CT scan (i.e. have a high CT number since the contrast agent absorbs the X-rays). Hence, at step S5, the processor determines whether there are a number of bright patches within the brain tissue in the cross-section, representing blood vessels including contrast agent. If these bright patches are present, then the processor determines that the cross-section does show contrast. If the bright patches are not present, then the processor determines that the cross-section does not show contrast.

A detailed discussion of how the processor determines whether or not the cross-section shows visible signs of contrast is given later, with reference to FIG. 6.

If, at step S5, the processor 112 determines that the cross-section does show contrast, then the method proceeds to step S6, in which the processor 112 determines that the entire CT scan was taken using a contrast agent. In other words, the processor 112 determines that the received CT scan is a contrast CT scan, irrespective of whether the cross-section is consequential or inconsequential.

In this embodiment, at step S6 the processor 112 of the contrast detection apparatus 110 controls the communication interface 111 to transmit a contrast detection result to the contrast enquiry apparatus 120, indicating that the CT scan was taken using contrast. However, embodiments are not limited this. For example, in alternative embodiments, the result could be transmitted to a different apparatus, stored for later retrieval, or displayed on a display panel at the contrast detection apparatus 110.

If, at step S5, the processor 112 determines that the cross section does not show visible signs of a contrast agent, then the method proceeds to step S7.

At step S7, the processor 112 retrieves the consequential-determination result from the storage 113 (i.e. the result stored in the storage 113 at step S4). If the processor 112 determines that the cross-section is consequential (i.e. the cross-section does not show a large proportion of sulci and is therefore not near the top of the brain), then the method proceeds to step S8.

At step S8, the processor 112 determines that the entire CT scan was taken without contrast agent. In other words, the processor 112 determines that the received CT scan is not a contrast CT scan, because a consequential cross-section does not show contrast.

In this embodiment, at step S8 the processor 112 of the contrast detection apparatus 110 controls the communication interface 111 to transmit a contrast detection result to the contrast enquiry apparatus 120, indicating that the CT scan was taken without contrast. However, embodiments are not limited this. For example, in alternative embodiments, the result could be transmitted to a different apparatus, stored for later retrieval, or displayed on a display panel at the contrast detection apparatus 110.

If, at step S7, the processor 112 determines that the cross-section is inconsequential (i.e. not consequential), the method goes back to step S2, in which a new cross-section is selected. In this embodiment, the new cross-section is selected by adding 50 to the most recently selected cross-section. For example, if the most recently selected cross-section was the 50th in the sequence, then the next selected cross section would be the 100th, then the 150th etc. However, embodiments are not limited to this, and in other embodiments, other methods for selecting the next cross-section can be used instead, as discussed further later.

In this embodiment, this process continues until the method reaches step S6 (i.e. determines that contrast was used) or step S8 (i.e. determines the contrast was not used). However, embodiments are not limited to this. For example, in some embodiments, in response determining that the answer to step S5 is 'no' a predetermined threshold number of times (i.e. after a predetermined number of iterations of steps S2-S7), the method proceeds to step S8 and determines that the CT scan does not include contrast. For example, the predetermined threshold could be 10, or even 5.

Through the method of FIG. 2 discussed above, the contrast detection apparatus 110 provides an efficient method for determining whether a CT scan (comprising a plurality of cross-sections) was taken with or without contrast. In particular, by identifying whether or not a cross-section is a consequential cross-section (at step S4), the contrast detection apparatus 110 is able to determine whether it is necessary to check for the presence of contrast in another CT cross-section, or whether the lack of contrast in a given CT cross-section is sufficient to conclude that the CT scan did not use contrast.

Hence, the use of steps S4 and S7 provide a quick manner for determining that a CT scan (comprising a plurality of cross-sections) does not include contrast.

This result can then be used to correctly process the CT scan. For example, if the result of FIG. 2 is that the CT scan does include contrast, then the CT scan could be input into a machine learned model which has been trained to classify brain bleeds in contrast CT images, whereas if the CT scan does not include contrast, it could be input into a machine learned model which has been trained to classify brain bleeds in non-contrast CT images. As discussed above, a brain bleed in a contrast CT scan appears different to a brain bleed in a non-contrast CT scan, and therefore a machine learned model train to classify brain bleeds in non-contrast CT scans may incorrectly classify a contrast CT scan as not having a brain bleed, when a brain bleed is in fact present. Hence, the method of FIG. 2 is provides important information for the subsequent processing of the CT scan.

While steps S4 and S7 are separate steps in this embodiment, embodiments are not limited to this. In a variant of this embodiment, the contrast detection apparatus could skip step S4 and instead determine whether or not the cross-section is consequential at step S7. As a result, the determination of whether or not the cross-section is consequential would only be necessary if the answer at step S5 was 'no', providing further efficiency. In other words, step S4 is only performed if the answer at step S5 is 'No'.

As discussed above, in this embodiment, at step S2 of FIG. 2 the processor 112 selects the 50th cross section, and adds 50 in each iteration (i.e. if the method returns to step S2, then the 100th cross-section is selected, then the 150th). However, embodiments are not limited to this, and any suitable cross-section could be selected (e.g. starting at the 20th and adding 5 each iteration).

In other embodiments, the processor can instead select the cross-section at step S2 by initially sub-sampling the received CT scan in order to find the best cross-sections to be processed (i.e. the cross-sections most likely to be consequential). In some embodiments, the processor does this by choosing 20 equally spaced cross-sections and then organising them in order of priority. In some embodiments, a cross-section near to the top of the scan has a high priority, while a cross-section near to the bottom of the scan has a low priority.

Through this method, the processor can efficiently process all received scans, irrespective of how much of the body they include. For example, even if the scan includes both the head and neck, the processor begins with cross-sections at the top of the scan which are more likely to include brain tissue, instead of first having to work all the way through the neck cross-sections. Put simply, cross-sections at the top (i.e. start) of a scan can be assigned a higher priority, and therefore assessed first, because they are more likely to show consequential brain tissue than cross-sections near to the bottom (i.e. end) of the scan.

In other embodiments, the processor can work statistically, based on a large batch of scans. For example, based on the last 100 scans, it was found that the $15^{th}$ cross section is consequential 80% of the time, while the $1^{st}$ cross-section is consequential only 10% of the time, the processor assigns the $15^{th}$ cross-section in subsequent scans a high priority and the $1^{st}$ cross-section a low priority. As such, in the subsequent scans the processor begins with the $15^{th}$ cross-section and is therefore likely to immediately find a consequential cross-section.

Some aspects of the steps of FIG. 2 will now be discussed with reference to the example cross sections in FIG. 3 and FIGS. 4A-D.

FIG. 3 shows an example of a CT cross section which does not include brain tissue. As can be seen in FIG. 3, there is no loop of pixels with CT numbers above 1000 Hounsfield units, with the loop having a diameter of at least 300 pixels (representing the skull), with a plurality of pixels inside the loop having an average (mean) CT number between 0-100 Hounsfield units.

Hence, if a CT scan including the cross-section of FIG. 3 was received at step S1, and the cross-section was selected at step S2, then at step S3 the processor would determine that the cross-section does not include brain tissue and return to step S2. This would continue until a cross-section with brain tissue was identified.

FIGS. 4A-D show example CT cross sections which do show brain tissue. Hence, if a CT scan was received by the contrast determination apparatus 110 which included one of these cross-sections, and that cross-section was selected at step S2 of the method of FIG. 2, then at step S3 the processor would determine that the cross-section does include brain tissue, and would continue on to step S4.

As previously discussed, at step S4 the processor 112 determines whether the cross-section is consequential based on the size and structure of sulci shown in the cross-section. As shown in FIGS. 4A and 4C, no sulci are visible and so the cross-sections of FIGS. 4A and 4C are consequential. In contrast, as shown in FIGS. 4B and 4D, sulci are visible, so the cross-sections of FIGS. 4B-4D are inconsequential. The method for determining whether the cross-section is consequential used in this embodiment will be discussed in detail with reference to FIG. 5.

As previously discussed, the next step of the method is to determine whether the cross-section shows contrast, at step S5. As can be seen in the cross-sections of FIGS. 4A and 4B, there are very few bright patches in the brain tissue, so the processor 112 would determine that these cross-sections do not show visible signs of contrast. As can be seen in FIGS. 4C and 4D, many bright patches are shown, so these cross-sections do show visible evidence of a contrast agent.

Table 1 shows a summary of the above discussion of FIGS. 4A-D, including the answers the eventual result of these cross-sections if they were selected at step S2 of FIG. 2:

TABLE 1

| FIG. | Consequential? | Shows contrast? | Result of FIG. 2 if selected at S2 |
|------|----------------|-----------------|-----------------------------------|
| 4A | Yes | No | S8 - CT scan does not include contrast |
| 4B | No | No | Return to S2 |
| 4C | Yes | Yes | S6 - CT scan includes contrast |
| 4D | No | Yes | S6 - CT scan includes contrast |

As can be seen in Table 1, out of the four types of cross-section which are selected for the detection of contrast in FIG. 2, three of these (i.e. 75%) result in a decision as to whether or not the CT scan used contrast. The only type of scan which does not result in a conclusion is an inconsequential scan which does not show contrast.

As discussed above, it is important for automated processing (e.g. AI classification) of CT scans to know whether contrast was used in the scan (e.g. so that the CT scan be input into the correct AI classifier). The method of FIG. 2 requires that only a small number (typically one or two) of cross-sections be assessed before a conclusion can be reached as to whether or not a head CT scan was taken with or without contrast.

FIG. 5 is a flowchart showing how the contrast detection apparatus 110 determines whether the selected cross-section is consequential in this embodiment. In other words, FIG. 5 is a flowchart showing how step S4 of FIG. 2 is performed in this embodiment. As discussed in detail below, in FIG. 5, the processor 112 calculates the Euler number of pixels in the cross-section which have values below the median, and uses this to represent the size and structure of sulci in the cross section, so as to determine whether or not cross-section is consequential.

At step S41, the processor 112 calculates a brain median value of the cross-section. As discussed above, the processor 112 has previously determined where the brain tissue is in the cross-section at step S3 (i.e. inside the loop). Hence, the processor 112 determines the median value of all of the pixels representing brain tissue. For example, the processor 112 may determine that the median value is 40 Hounsfield units.

While the brain median value is used in this embodiment, other embodiments are not limited to this. It will be appreciated that in variants of this embodiment, a different average could be used instead, such as a brain mean value.

At step S42, the processor 112 creates a binary image of the cross-section. Pixels with a value below the median are assigned a value of 1, while pixels with values equal to or above the median are assigned a value of 0.

At step S43, the processor 112 determines the Euler number (i.e. Euler characteristic) of the binary image. In broad terms, the Euler number is given by Equation 1:

Euler Number=Number of Connected Components−Number of Holes     Equation 1

Hence, the Euler number is a measure of the topology of the binary image, indicating how 'chaotic' the binary image is. A negative Euler number indicates that the image is more chaotic, while a positive number indicates that the image is less chaotic.

It has been found that cross-sections of areas of brain which include a large proportion of sulci (e.g. near the top of the brain) result in a positive Euler number. Hence, a positive Euler number indicates that the cross-section is inconsequential, while a negative Euler number indicates that the cross-section is consequential.

In this embodiment, the Euler number is calculated using the 'bweuler' function in Matlab. Specifically, the processor 112 runs the 'bweuler' function, with the binary image as an input, in Matlab, and the Euler number is output. While this method is used in this embodiment, embodiments are not limited to this, and it will be appreciated that any suitable method of calculating the Euler number could be used instead.

Once, the Euler number is calculated, the processor 112 determines whether it is negative. If the Euler number is negative, then the method proceeds to step S44, in which the processor determines that the cross-section is consequential. If the Euler number is not negative (i.e. is zero or positive), then the processor determines that the cross-section is not consequential (i.e. is inconsequential). This is because, as discussed above, a negative Euler number indicates a more chaotic sequence, while a positive number indicates a more organised sequence.

After either step S44 or step S45, the method continues to step S5 in FIG. 2.

Hence, through the calculation of the Euler number of a binary image of pixels in the cross-section with values (i.e. CT numbers) below the median, the processor 112 is able to determine a size and structure of sulci shown in the cross-section and therefore whether the cross-section is or is not consequential.

As discussed above, by determining whether or not the cross-section is consequential, the processor 112 is able to efficiently reach a conclusion that the cross-section does not include contrast. In particular, if a cross-section does not show visible signs of a contrast agent and it is determined that the cross-section is consequential, the processor 112 can conclude that the entire CT scan does not include contrast. If it was not determined whether the cross-section is consequential, the processor would need to determine that contrast is not shown in a large number of cross-sections before it could be concluded that the entire CT scan does not include contrast.

While in this embodiment, the boundary between consequential and inconsequential is at an Euler number of zero (i.e. negative Euler number indicates consequential, while positive Euler number indicates inconsequential), embodiments are not limited to this specific boundary. For example, in some embodiments, the boundary could instead be placed at +1.

Furthermore, while this method of determining whether the cross-section is consequential or inconsequential is used in this embodiment, other embodiments are not limited to this. Any suitable method for determining whether the cross-section is consequential or inconsequential (e.g. any suitable method for determining whether there are a large proportion of sulci present in the cross-section) can be used instead. This is discussed in more detail later.

Figure 6:
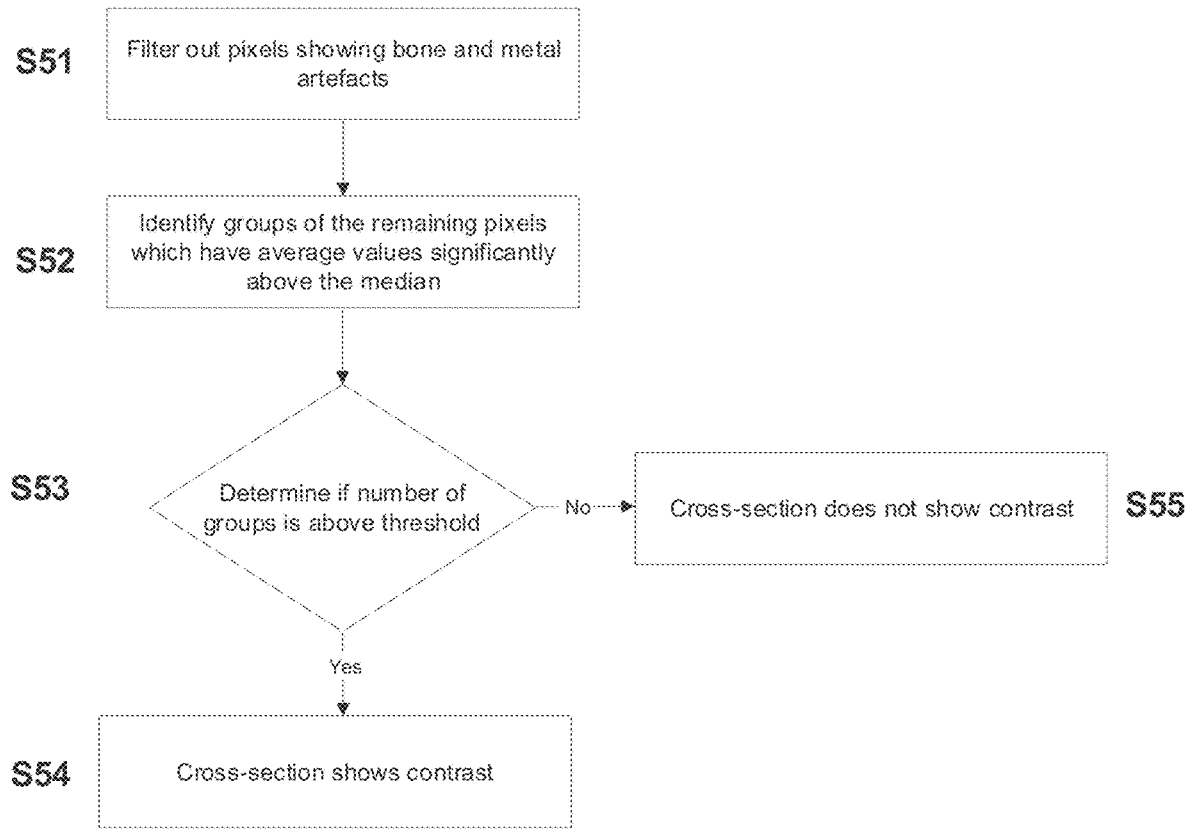
FIG. 6 shows a flow chart of the operation of the embodiment.

FIG. 6 is a flowchart showing how the contrast detection apparatus 110 determines whether the selected cross-section shows contrast or not in this embodiment. In other words, FIG. 6 is a flowchart showing how step S5 of FIG. 2 is performed in this embodiment.

At step S51, the processor 112 filters out (i.e. chooses to ignore) pixels showing bone and metal artefacts. In this embodiment, the processor 112 does this by filtering out pixels in the selected cross-section with values above a threshold of 1000 Hounsfield units (e.g. bone and metallic artefacts). While the threshold of 1000 Hounsfield units is used in this embodiment, other embodiments are not limited to this. For example, a threshold of 500 Hounsfield units could be used instead.

At step S52, the processor identifies groups of the remaining pixels (i.e. pixels which have not been filtered out) which have average values significantly above the median (which was calculated at step S41). The processor performs this step by identifying all groups with pixels (i.e. groups of at least five pixels) which have an average pixel value (i.e. CT number) at least 40 Hounsfield units above the median.

In other words, the processor 112 identifies all of the bright patches in the brain tissue. Bright patches represent blood vessels including a mix of blood and contrast agent. This is because the contrast agent absorbs X-rays, and therefore results in a high CT number (e.g. 100 Hounsfield units) for the blood vessels.

While the thresholds of five pixels and 20 Hounsfield units are used in step S52, embodiments are not limited to this. For example, in a variant of this embodiment, the thresholds are 10 pixels and 25 Hounsfield units. In another variant, the thresholds are two pixels and 15 Hounsfield units.

At step S53, the processor determines if the number of identified groups exceeds a threshold. In this embodiment, the threshold is 20 groups. However, embodiments are not limited to this, and other thresholds (e.g. 25) could be used instead, as discussed further later.

If the processor 112 determines that the number of identified groups does exceed the threshold, then the method proceeds to step S54, in which the processor 112 determines that the cross-section does show contrast (and therefore the method proceeds to step S6 of FIG. 2). If the processor 112 determines that the number of groups is not above the threshold, then the method proceeds to step S55, in which the processor 112 determines that the cross-section does not show contrast (and therefore the method proceeds to step S7 of FIG. 2).

Hence, in this embodiment, the contrast detection apparatus 110 uses the facts that in a contrast CT, the contrast agent is mixed with blood in blood vessels, and that the contrast agent absorbs a high proportion of X-rays, resulting in a high CT number, and therefore a bright patch in a cross-section including the contrast. In view of this, the processor 112 determines whether such bright patches are present in the cross-section, and determines that the cross-section shows contrast if they are.

While the contrast detection apparatus uses the specific method of FIG. 6 in this embodiment, embodiments are not limited to this. It will be appreciated that any suitable method of identifying whether contrast is visible in the image could be used instead.

While step SM of FIG. 6 is performed separately to step S52 in this embodiment, embodiments are not limited to this. For example, in a variant of this embodiment, steps S51 and S52 are integrated. In other words, rather than initially filtering out pixels above a threshold of e.g. 1000 Hounsfield units, and subsequently identifying groups out of the remaining pixels which have an average value of e.g. 40 Hounsfield units above the media, the processor could, in one step, identify groups of pixels with an average value between 40 Hounsfield units above the median and 200 Hounsfield units.

In a variant of this embodiment, at step S51 the processor 112 also filters out the line in the middle of the brain (e.g. as shown in FIGS. 4B-D) at step S51. In other words, the processor can also filter out the area separating the left side of the brain and the right side of the brain. Since the anatomical structure of the brain is known, the processor can identify this line. In other words, since the brain tissue has been identified at step S3, the processor can filter out the central line by filtering out pixels along a vertical line in the centre of the area of brain tissue identified at step S3.

The reason for filtering out this central line is because it may be denser than the surrounding tissue. As a result, along this central line, bright patches may be shown which are unrelated to the presence of the contrast agent. Hence, by filtering out the central line, the possibility of incorrectly identifying these bright patches as showing contrast agent is avoided.

In another variant of this embodiment, the processor 112 applies a different threshold at step S53. Instead of determining whether the total number of groups is above at threshold number (e.g. 20), the processor instead determines whether the identified patches are distributed across the brain. For example, the processor could instead determine whether there are a threshold number of groups in each side (i.e. left and right sides) of the brain. In other words, the processor could determine whether there are a threshold number of groups on the right side of the brain and a threshold number of groups on the left side of the brain. As an example, this threshold could be three. If there are at least three bright patches on each of the left and right sides of the brain, then the processor could determine that the cross-section does show contrast.

In a further variant, both thresholds are applied. For example, the processor determines that contrast is shown if either the total number of bright patches is above 20, or there are at least three bright patches on each side of the brain.

Figure 7:
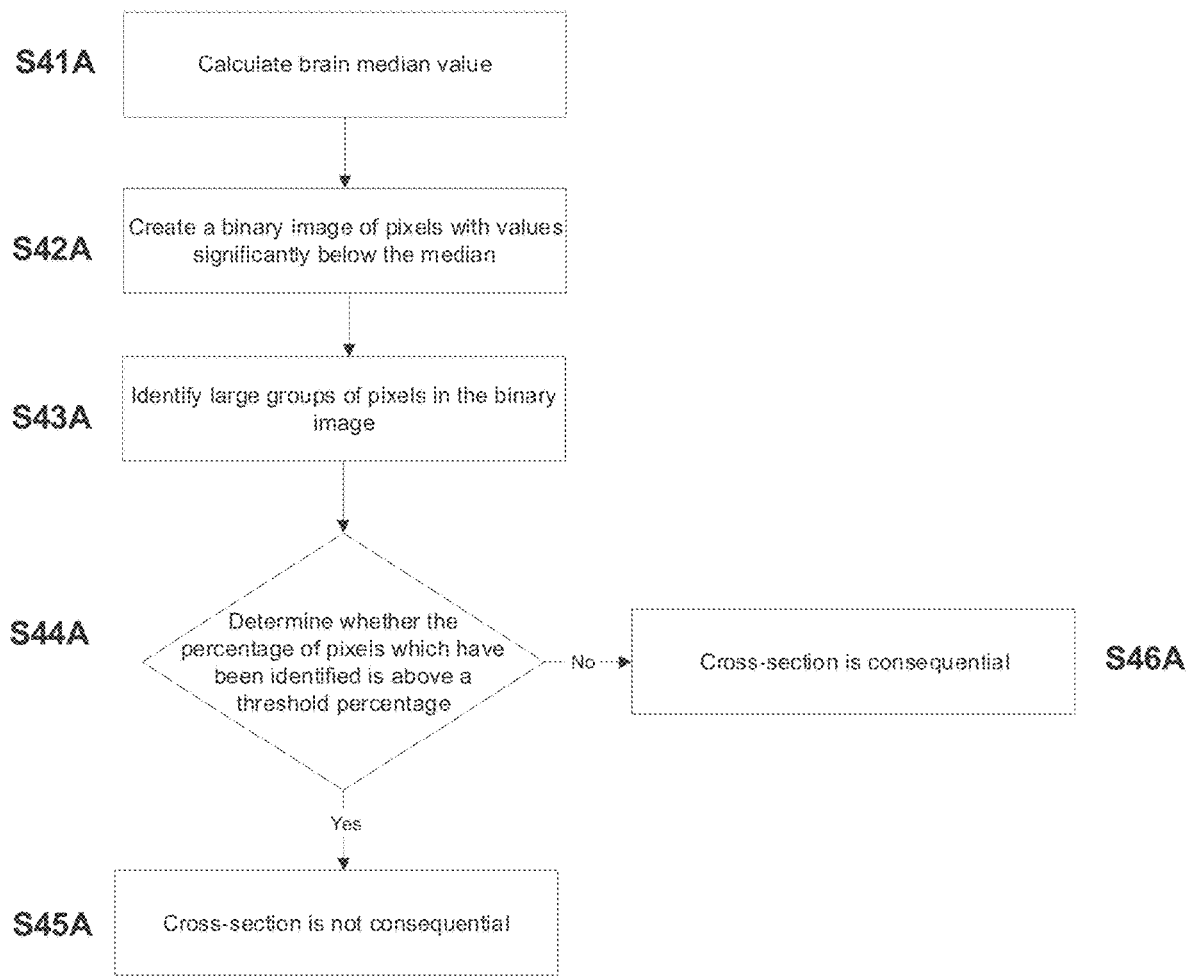
FIG. 7 shows a flow chart of the operation of a variant of the embodiment.

FIG. 7 is a flowchart showing how the contrast detection apparatus 110 determines whether the selected cross-section is consequential according to a variant of this embodiment. In other words, FIG. 7 is a flowchart showing how step S4 of FIG. 2 is performed according to a variant of this embodiment. Put differently, in a variant of this embodiment, the method of FIG. 5 is replaced by the method of FIG. 7.

At step S41A, the processor 112 calculates a brain median value of the cross-section. As discussed above, the processor 112 has previously determined whether the brain tissue is in the cross-section at step S3 (i.e. inside the loop). Hence, the processor 112 determines the median value of all of the pixels representing brain tissue. For example, the processor 112 may determine that the media value is 40 Hounsfield units.

At step S42A, the processor 112 creates a binary image of pixels with values significantly below the median. In other words, the processor 112 creates a binary image of the cross-section in which pixels with a value significantly below the median are assigned a value of 1, while pixels with values which are not significantly below the median are assigned a value of 0. In this variant, a pixel value is considered to be significantly below the median if its value (i.e. its CT number) is at least 20 Hounsfield units below the median. However, other variants are not limited to this and other definitions of significantly below the median could be used instead (e.g. 25 Hounsfield units below the median).

At step S43A, the processor 112 identifies large groups of pixels in the binary image with a value of 1. In this embodiment, 'large groups' are groups of at least 10 pixels in which 80% of the pixels in the group have a value of 1. However, other variants are not limited to these thresholds, and other thresholds could be used instead to determine whether large groups of pixels are present in the binary image.

Hence, at step S43A, the processor filters out small groups of pixels in the binary image, and identifies only large groups. The large groups of pixels in the binary image represent large groups of dark pixels in the original cross-section. Since sulci are shown as large groups of dark pixels in the original cross-section, at step S43A the processor is identifying sulci in the original cross-section.

At step S44A, the processor 112 determines whether the percentage of pixels in the binary image which have been identified as being part of a large group is above a predetermined threshold. In this variant, the threshold is 20% of the total number of pixels. However, variants of the embodiment are not limited to this, and any other suitable threshold could be used instead.

Hence, at step S44A, the processor 112 is effectively determining how much sulci are shown in the selected cross section. If the percentage of identified pixels is above the threshold, then a large amount of sulci are shown in the cross-section. If the percentage of identified pixels is not above the threshold, then a small amount of sulci are shown in the cross-section (or none is shown at all).

If the processor 112 determines that the percentage of identified pixels is above this threshold (and therefore a large amount of sulci are present), then the method proceeds to step S45A in which the processor 112 determines that the cross-section is not consequential (i.e. is inconsequential).

If the processor 112 determines that the percentage of identified pixels is not above the threshold (and therefore a large amount of sulci are not present), then the method proceeds to step S46A in which the processor 112 determines that the cross-section is consequential.

After either step S45A or step S46A takes place, the method then proceeds to step S5 of FIG. 2.

Hence, the variant of FIG. 7 provides an alternative to the method of FIG. 5 for determining whether a cross-section is consequential, based on an amount of sulci shown in the cross-section.

While the method of FIG. 7 involves creating a binary image at step S42A, other variants are not limited to this. In other words, in some variants, at step S43A the processor 112 could instead analyse the original cross-section and simply identify any large groups of pixels with an average pixel value significantly below the median, without needing to create an analyse a binary image first.

Furthermore, while the method of FIG. 7 has been discussed separately to the method of FIG. 5 here, embodiments are not limited to this. In a variant of this embodiment, both methods could be applied (i.e. FIG. 5 and FIG. 7), and a cross-section would only be determined as consequential if both methods agree (i.e. that the answer at step S43 is 'Yes' and the answer at step S44A is 'No'). Hence, this would reduce any possible error in designating cross-sections as consequential, thereby improving the overall contrast detection functionality of the contrast detection apparatus.

Figure 8:
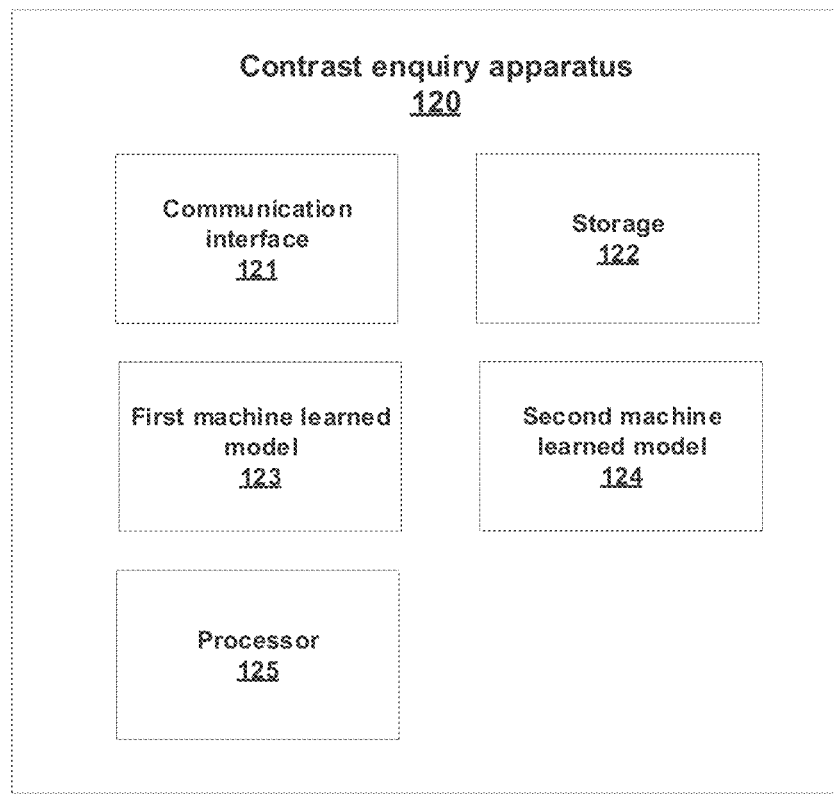
FIG. 8 shows a schematic illustration of a contrast enquiry apparatus according to an embodiment.

FIG. 8 shows more detail regarding the contrast enquiry apparatus 120 of the system 100 shown in FIG. 1. The contrast enquiry apparatus 120 comprises a communication interface 121, a storage 122, a first machine learned (ML) model 123, a second ML model 124, and a processor 125.

As previously discussed, the contrast enquiry apparatus 120 is configured to transmit a head CT scan to the contrast detection apparatus 110 over the network 160, and to receive a contrast detection result from the contrast detection apparatus 110. In other words, the contrast enquiry apparatus 120 is configured to send data corresponding to a sequence of a plurality of cross-sections obtained from a CT scan of the head, and to receive data from the contrast detection apparatus 110 indicating that the CT scan is either a contrast CT scan or is a non-contrast CT scan. The communication interface 121 of the contrast enquiry apparatus 120 is configured to perform this transmitting and receiving.

The storage 122 is configured to store the head CT scan. In other words, the storage 122 is configured to store the sequence of the plurality of cross-sections obtained from the CT scan of the head.

The first ML model 123 is configured to classify brain bleeds in contrast head CT scans. In other words, the first ML model 123 is configured to receive a contrast head CT scan as an input, to process the contrast head CT scan, and to output a result indicating whether or not the contrast head CT scan shows a brain bleed.

The first ML model 123 has been trained using a database of contrast head CT scans to classify brain bleeds. In this embodiment, the first ML model 123 comprises a neural network which has been trained to classify bleeds using backpropagation. In a variant of this embodiment, the backpropagation is combined with stochastic gradient descent. However, embodiments are not limited to this, and it will be appreciated that any suitable training algorithms could be used. For example, any of the Inception, AlexNet, or VGG16 frameworks could be used to train first ML model 123.

The second ML model 124 is configured to classify brain bleeds in non-contrast head CT scans. In other words, the second ML model 124 is configured to receive a non-contrast head CT scan as an input, to process the non-contrast head CT scan, and to output a result indicating whether or not the non-contrast head CT scan shows a brain bleed.

The second ML model 124 has been trained using a database of non-contrast head CT scans to classify brain bleeds. In this embodiment, the second ML model 124 comprises a neural network which has been trained to classify bleeds using backpropagation. In a variant of this embodiment, the backpropagation is combined with stochastic gradient descent. However, embodiments are not limited to this, and it will be appreciated that any suitable training algorithms could be used. For example, any of the Inception, AlexNet, or VGG16 frameworks could be used to train second ML model 124.

The processor 125 is configured to process the contrast detection result received by the communication interface 121, to determine which of the first ML model 123 and the second ML model 124 to input the CT scan into, and to control the determined one of the first ML model 123 and the second ML model 124 to classify the CT scan (i.e. to output a result indicating whether or not the CT scan shows a brain bleed). If the contrast detection result indicates that the CT scan was taken with contrast, the processor 125 is configured to control the first ML model 123 to classify the CT scan. If the contrast detection result indicates that the CT scan was taken without contrast, the processor 125 is configured to control the second ML model 124 to classify the CT scan. This will be discussed in detail with respect to FIG. 9.

Figure 9:
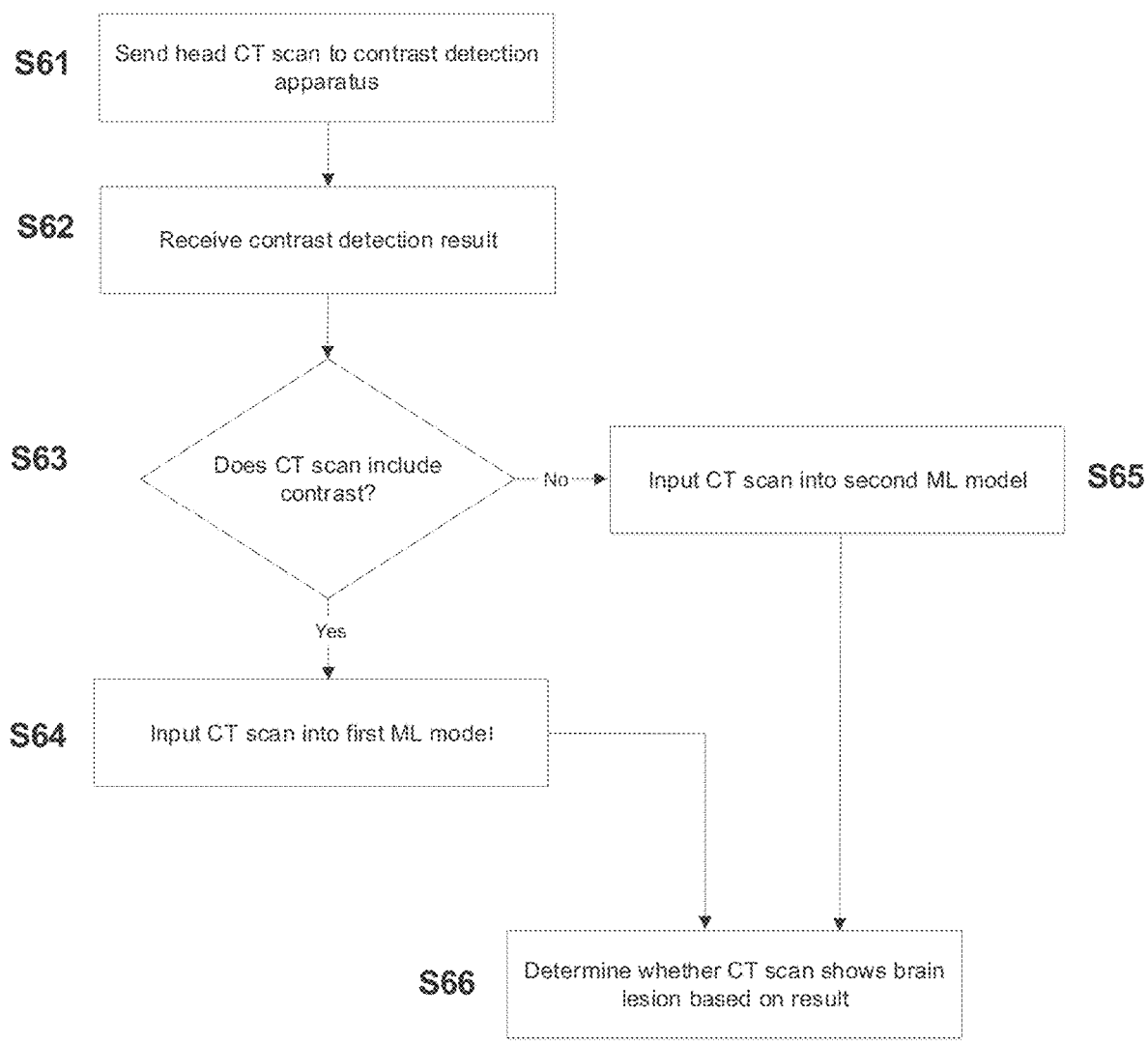
FIG. 9 shows a flow chart of the operation of an embodiment.

FIG. 9 is a flowchart showing the operation of the image enquiry apparatus 120 of FIG. 8.

The method of FIG. 9 starts at step at step S61, in which the processor 125 of the image enquiry apparatus retrieves a head CT scan from the storage 122 and transmits the heat CT scan to the contrast detection apparatus 110.

As previously discussed with reference to FIG. 2, upon receiving the head CT scan, the contrast detection apparatus 110 determines whether or not the CT scan includes contrast, and transmits the contrast detection result to the image enquiry apparatus.

Hence, the next step performed by the image enquiry apparatus is at step S62, in which the communication interface 121 receives the contrast detection result.

At step S63, the processor 125 processes the contrast detection result to determine which ML model to use to classify the CT scan.

If the contrast detection result indicates that the CT scan does includes contrast, the method proceeds to step S64, in which the processor 125 retrieves the CT scan from the storage 122 and inputs the CT scan into the first ML model 123 to classify the CT scan (i.e. to determine whether or not the CT scan shows a brain bleed).

If the contrast detection result indicates that the CT scan does not include contrast, the method instead (i.e. instead of proceeding to step S64) proceeds to step S65, in which the processor 125 retrieves the CT scan from the storage 122 and inputs the CT scan into the second ML model 124 to classify the CT scan (i.e. to determine whether or not the CT scan shows a brain bleed).

After either step S64 or step S65 takes place, the method proceeds to step S66, in which the processor 125 obtains the output classification result from either the first ML model 123 (if step S64 took place) or the second ML model 124 (if step S65 took place). The classification result indicates whether or not the CT scan shows a brain bleed.

In this embodiment, at step S66 the processor 125 stores the classification result in the storage 122. However, embodiments are not limited to this. For example, in some embodiments, the processor may control the communication interface to transmit the result to another apparatus, or the image enquiry apparatus 120 comprises a display and displays the result. In other embodiments, the classification result is only transmitted or displayed if it indicates that a brain bleed is shown in the CT scan.

By transmitting the CT scan to the contrast detection apparatus 110 to determine whether the CT scan was taken with or without contrast, the image enquiry apparatus is able to input the CT scan into the correction ML classification model, and is therefore able to accurately determine whether or not the CT scan shows a brain bleed.

As previously discussed, contrast CT scans show many more bright patches than non-contrast CT scans due to the presence of contrast agent. Brain bleeds are also shown in CT scans as bright patches. As a result of this, if an ML classification model which has been trained using non-contrast CT scans receives a contrast CT scan as an input (which does not show a brain bleed), the ML classification model may incorrectly classify the CT scan as showing a brain bleed due to the presence of bright patches.

The system 100 of this embodiment accounts for this by first determining whether or not the CT scan was taken with contrast, and then using one of two different ML classification models based on the result. As such, an appropriate classification model can be used to determine whether or not a brain bleed is shown.

Hence, according to this embodiment, the system 100 can automatically and accurately process head CT scans to determine whether or not they show brain bleeds.

While various functionalities of this embodiment have been split between the contrast detection apparatus 110 and the contrast enquiry apparatus, it will be appreciated that embodiments are not limited to this, and such functionality could be included in a single apparatus, or a plurality of separate apparatuses.

Furthermore, while the contrast detection apparatus 110 has been described as part of a system 100 including an image enquiry apparatus 120 configured to identify brain bleeds in CT scans, it will be appreciated that embodiments are not limited to this.

While this embodiment has been discussed with reference to ML models, embodiments are not limited to this. It will be appreciated that any suitable image analysis unit can be used instead.

In particular, the contrast detection apparatus can be used in any system in which a determination as to whether a head CT scan was taken with our without contrast is useful. Put simply, the contrast detection apparatus 110 can be used independently of the contrast enquiry apparatus 120.

As discussed above, embodiments provide an efficient method for determining whether a head CT scan was taken using contrast, based on both whether contrast is visible in a given cross-section, and whether that cross-section is consequential. Since non-consequential cross-sections are characterised by the presence of a significant amount of sulci, embodiments of can determine whether a cross-section is consequential based on how much sulci are present in the cross-section.

In particular, embodiments provide an efficient method for determining that a head CT scan was taken without contrast, by determining whether a lack of visible contrast in a given cross-section is sufficient to determine that no contrast was used in the entire CT scan, based on an amount of sulci shown in the cross-section.

The result of this determination can then be used for further processing of the image. As discussed above, in order to accurately, identify whether or not a head CT scan shows a brain bleed (or a number of other conditions), it first needs to be determined whether the CT scan was taken with or without contrast. The system discussed above, determines whether or not the CT scan was taken with contrast, and uses this information to use an appropriate ML model to subsequently determine whether or not the CT scan shows a brain bleed.

The determination as to whether a CT scan is taken with or without contrast is also important in a number of other contexts. In many clinical applications, it is vital to know when contrast agent arrived at a target area, and the contrast detection apparatus of the above embodiments can be used to provide this information.

In CT scans taken with contrast, the contrast agent absorbs a high proportion of X-rays. Therefore, when a contrast CT scan takes place, areas with a high concentration of contrast agent (such as blood vessels) absorb more of the X-rays and therefore appear brighter in the CT scan. Hence due to the function of the contrast agent, each of the cross-sectional images in a contrast CT scan appear different than if a contrast agent was not used in the scan.

In order to correctly perform automated processing of CT scans, there is therefore a need to determine whether the CT scans were taken with or without contrast.

However, when a contrast agent is used in a CT scan, not all cross-sections in the scan show visible evidence of the contrast agent. In a head CT scan, this is particularly true for top areas of the brain As such, the lack of contrast in a particular cross-section does not necessarily mean that contrast was not used in the entire CT scan.

Conventional methods of determining whether a CT scan was taken with contrast require a large number of cross-sections to be analysed before it can be determined that the CT scan was taken without contrast. Since modern high-resolution CT images have, in some cases, over 1000 cross sections, processing such a large volume of data to determine whether a CT scan includes contrast can be costly and time consuming, causing a delay in the processing pipeline. Hence, there is a need to identify whether a CT scan has been taken with or without contrast, in an efficient manner.

In the contrast detection apparatus of embodiments, a processor determines whether an amount of sulci in a selected cross-section is below a threshold amount. If so, it can be determined that the cross-section is not of the top of the brain (since the top of the brain is characterised by the presence of sulci). A cross-section which is not of the top of the brain (e.g. is of the middle of the brain) will show contrast if the CT scan was taken with contrast. Hence, by determining that the cross-section (of the middle of the brain) does not show contrast, the processor can determine that the entire head CT scan was taken without contrast, based on a single cross-section.

Embodiments can provide a computer a non-transitory computer readable medium storing software comprising instructions executable by one or more computers which, upon such executions, causes the one or more computers to perform the method of embodiments.

Examples of computer-readable media include both volatile and non-volatile media, removable and non-removable media, and include, but are not limited to: solid state memories; removable disks; hard disk drives; magnetic media; and optical disks. In general, the computer-readable media include any type of medium suitable for storing, encoding, or carrying a series of instructions executable by one or more computers to perform any one or more of the processes and features described herein.

The apparatuses described above may be implemented on a single device or multiple devices in communication. More generally, it will be appreciated that the hardware used by embodiments can take a number of different forms. For example, the components of embodiments could be provided by a single device, or different components of could be provided on separate devices. More generally, it will be appreciated that embodiments can provide a system that comprises one device or several devices in communication.

Although some embodiments are described above in which the internet is used, this is not essential to the present invention. Embodiments can be applied to an application shared between machines that communicate with each other, for example, over a network. Therefore, although the specific embodiment network uses the Internet, the present invention is applicable to any network whether it be a conventional landline network or a wireless network. More specifically, embodiments are applicable to the Internet, an intranet, an extranet, a local area network, a wide area network or a network employing wireless application protocol.

Many further variations and modifications will suggest themselves to those versed in the art upon making reference to the foregoing illustrative embodiments, which are given by way of example only, and which are not intended to limit the scope of the invention, that being determined by the appended claims.

The invention claimed is:

1. An apparatus for analysing a head CT scan, wherein the head CT scan comprises a plurality of cross-sections, the apparatus comprising a processor configured to:
    select a first cross-section from among the plurality of cross-sections in the head CT scan; and
    analyse pixel values of a plurality of pixels in the first cross-section to determine whether the whole head CT scan was taken with contrast, the analysing comprising:
        determining whether the first cross-section shows contrast, based on computing parameters characterizing bright patches in the first cross-section,
        determining whether an amount of sulci in the first cross-section is below a threshold amount based on computing parameters characterizing dark patches in the first cross-section,
        in response to determining that the first cross-section shows contrast, determine that the whole head CT scan was taken with contrast, and
        in response to the determining that the first cross-section does not show contrast and that the amount of sulci is below the threshold amount determining that the whole head CT scan was taken without contrast.

2. The apparatus of claim 1, wherein the processor is further configured to, in response to determining that the first cross-section does not show contrast and that the amount of sulci in the first cross-section is not below the threshold amount, select a second cross-section from among the plurality of cross-sections and analyse the second cross-section to determine whether the whole head CT scan was taken with contrast.

3. The apparatus of claim 1, wherein the processor is further configured to:
    identify a brain area in the first cross-section, the brain area showing brain tissue; and
    calculate an average brain pixel value of pixels from among the plurality of pixels in the cross section which are in the brain area.

4. The apparatus of claim 3, wherein the processor is configured to identify the brain area in the first cross-section by:
    identifying a maximal connected component in the cross-section, comprising a plurality of connected pixels with pixel values above a threshold pixel value,
    identifying the brain area as a largest hole in the maximal connected component.

5. The apparatus of claim 4, wherein the threshold pixel value is 1000 Hounsfield units.

6. The apparatus of claim 3, wherein the processor is configured to determine whether the amount of sulci in the first cross-section is below the threshold amount by:
    generating a binary image of pixels in the brain area which have a pixel value below the average brain pixel value;
    obtaining an Euler number of the binary image;
    determining whether the Euler number of the binary image is below a threshold Euler number; and
    determining that the amount of sulci in the first cross-section is below the threshold amount in response to determining that the Euler number of the binary image is below the threshold Euler number.

7. The apparatus of claim 6, wherein the threshold Euler number is zero.

8. The apparatus of claim 3, wherein the processor is configured to determine whether the amount of sulci in the first cross-section is below the threshold amount by:

generating a binary image of pixels in the brain area which have a pixel value below a threshold amount below the average brain pixel value;

identifying groups of pixels in the binary image representing pixels in the first cross-section with pixel values a threshold amount below the average brain pixel value;

determining whether a percentage of pixels in the binary image identified as being in a group is below a threshold percentage; and determining that the amount of sulci in the first cross-section is below the threshold amount in response to determining that the percentage of pixels identified as being in a group is below the threshold percentage.

9. The apparatus of claim 8, wherein the threshold percentage is 20%.

10. The apparatus of claim 8, wherein the threshold amount below the average brain pixel value is 20 Hounsfield units.

11. The apparatus of claim 3, wherein the processor is configured to determine whether the first cross-section shows contrast by:

identifying groups of pixels in the brain area, the groups of pixels having average pixel values a threshold amount above the average brain pixel value;

determining that the cross-section shows contrast in response to determining that the number of identified groups is above a threshold number of groups.

12. The apparatus of claim 11, wherein the threshold amount above the average brain pixel value is 40 Hounsfield units.

13. The apparatus of claim 11, wherein the threshold number of groups is 20.

14. The apparatus of claim 1, wherein the processor is configured to:

assign a plurality of priority levels to cross-sections in the CT scan based on a set of predetermined rules, and select the first cross-section as the cross-section in the CT scan with the highest priority level.

15. The apparatus of claim 14, wherein the priority levels decrease from cross-sections at a top of the CT scan to cross-sections at a bottom of the CT scan.

16. A system comprising:
the apparatus of claim 1, further comprising:
a first image analysis unit to analyse a CT scan taken with contrast and output a result indicating whether the CT scan shows a predetermined feature; and a second image analysis unit to analyse a CT scan taken without contrast and output a result indicating whether the CT scan shows a predetermined feature, wherein the processor of the apparatus is further configured to:

in response to determining that the whole head CT scan was taken with contrast, control the first image analysis unit to analyse the head CT scan, and in response to determining that the whole head CT scan was taken without contrast, control the second image analysis unit to analyse the head CT scan.

17. The system of claim 16, wherein at least one of the first image analysis unit and the second image analysis unit is an artificial intelligence, AI, classifier.

18. The system of claim 16, wherein the predetermined feature is a brain bleed.

19. A computer-implemented method for analysing a head CT scan, wherein the head CT scan comprises a plurality of cross-sections, the method comprising:

selecting a first cross-section from among the plurality of cross-sections in the head CT scan; and analysing pixel values of a plurality of pixels in the first cross-section to determine whether the whole head CT scan was taken with contrast, the analysing comprising:

determining whether the first cross-section shows contrast, based on computing parameters characterizing bright patches in the first cross-section, determining whether an amount of sulci in the first cross-section is below a threshold amount based on computing parameters characterizing dark patches in the first cross-section, in response to determining that the first cross-section shows contrast, determine that the whole head CT scan was taken with contrast, and in response to the determining that the first cross-section does not show contrast and that the amount of sulci is below the threshold amount determining that the whole head CT scan was taken without contrast.

* * * * *